United States Patent
Fischer et al.

[11] Patent Number: 5,865,402
[45] Date of Patent: Feb. 2, 1999

[54] TRIAXIALLY STABILIZED, EARTH-ORIENTED SATELLITE AND CORRESPONDING SUN AND EARTH ACQUISITION PROCESS USING A MAGNETOMETER

[75] Inventors: Horst-Dieter Fischer, Unterhaching; Petra Wullstein, Neubiberg; Jochim Chemnitz, München, all of Germany

[73] Assignee: Daimler-Benz Aerospace AG, Ottobrunn, Germany

[21] Appl. No.: 653,379

[22] Filed: May 24, 1996

[30] Foreign Application Priority Data

May 24, 1995 [DE] Germany ............ 195 18 617.6

[51] Int. Cl.$^6$ .................. B64G 01/32; B64G 01/36
[52] U.S. Cl. ............ 244/166; 244/171; 701/220; 701/222
[58] Field of Search .............. 244/164, 166, 244/171; 701/220, 222, 13

[56] References Cited

U.S. PATENT DOCUMENTS

| | | | |
|---|---|---|---|
| Re. 29,177 | 4/1977 | Michaelis | 244/166 |
| 3,769,710 | 11/1973 | Reister | 364/516 |
| 3,899,928 | 8/1975 | Fraiture | 73/178 |
| 4,084,773 | 4/1978 | Schmidt, Jr. et al. | 244/166 |
| 4,489,383 | 12/1984 | Schmidt, Jr. | 244/166 |
| 4,807,835 | 2/1989 | Fowler | 244/166 |
| 5,108,050 | 4/1992 | Maute | 244/164 |
| 5,123,617 | 6/1992 | Linder et al. | 244/166 |
| 5,259,577 | 11/1993 | Achkar et al. | 244/166 |
| 5,279,483 | 1/1994 | Blancke et al. | 244/166 |

FOREIGN PATENT DOCUMENTS

| | | |
|---|---|---|
| 0 338 687 A2 | 3/1989 | European Pat. Off. . |
| 0 461 394 A1 | 5/1991 | European Pat. Off. . |
| 0 571 239 | 4/1993 | European Pat. Off. . |
| 26 44 777 | 3/1978 | Germany . |
| 689 11 830 T2 | 4/1994 | Germany . |

OTHER PUBLICATIONS

P. van Otterloo, 1973/74, Die Lageregelung des niederländischen Satelliten ANS *Philips techn. Rdsch.* 33, 170–185.

*Primary Examiner*—Lissi Mojica
*Attorney, Agent, or Firm*—McGlew and Tuttle

[57] ABSTRACT

A triaxially stabilized earth oriented satellite is provided with an attitude control system. The attitude control system contains a controller, final control elements for generating control torques around each of three axes of a system of coordinates (principle axes x, y, z) fixed relative to the satellite. Additionally, the attitude control system comprises, as measuring transducers, exclusively a direction vector measurement device, like a magnetometer or star sensor, a sun sensor array and an earth sensor. The process of the invention makes use of the apparatus as noted above and includes the steps of:

A. determining an estimate for the rotating velocity of the satellite from a direction vector measurement;

B. searching for the sun, depending on the size of the field of view of the sensor, by one or two search rotations at right angles to the optical axis;

C. adjusting the direction of the sun relative to the optical axis; and

D. adjusting the direction vector measurement to a reference direction $S_r$, which is selected such that the optical axis of the earth sensor sweeps over the earth during rotation around $S_R$.

16 Claims, 2 Drawing Sheets

TRIAXIALLY STABILIZED, EARTH-ORIENTED SATELLITE AND CORRESPONDING SUN AND EARTH ACQUISITION PROCESS USING A MAGNETOMETER

FIELD OF THE INVENTION

The present invention pertains to a triaxially stabilized, earth-oriented satellite with an attitude control system which includes a controller, final control elements for generating control torques around each of the three axes of the system of coordinates (principle axes x, y, z) that is fixed relative to the satellite, a direction vector measurement, e.g., from a magnetometer or star sensor, and a sun sensor array, as well as to a process for performing the sun and earth acquisition in such satellites.

BACKGROUND OF THE INVENTION

Such a satellite has been known from H. Bittner et al., The Attitude Determination and Control Subsystem of the Intelsat V Spacecraft, published in *Proceedings of AOCS Conference,* Noordwijk, Oct. 3–6, 1977, ESA SP-128, November 1977. By means of its attitude control system, it is able to perform a great variety of maneuvers, which are necessary in the transfer orbit and the geostationary orbit, e.g., the sun acquisition, i.e., the pointing of the x axis of its system of coordinates (x, y, z), which system is fixed relative to the satellite, to the sun; the earth acquisition, i.e., the pointing of the z axis to the center of the earth; the apogee maneuver, i.e., the pointing of the z axis in the direction of the geostationary orbit in the apogee of the transfer orbit before insertion at the apogee into the final orbit; and, finally, all simple attitude control maneuvers for continuously maintaining the desired orientation, as well as all reacquisition maneuvers in the case of loss of attitude references, such as the sun and/or the earth.

The attitude control system of this prior-art satellite contains a controller for applying the actually required control laws, final control elements, namely, attitude control nozzles, for generating controlling torques around each of the three principal axes (x, y, z) of the satellite as a function of the control signals sent by the controller, as well as sun sensors, an earth sensor, and a redundantly designed, triaxially measuring set of gyroscopes for the direct measurement of the components of the rotating velocity vector of the satellite relative to the principal axes of the satellite. The sun sensors have a first field of view, which covers, on the whole, one half of the xz plane around the negative z axis and a certain width at right angles thereto, and a second field of view, which covers, on the whole, one third of the xy plane around the x axis and a certain width at right angles thereto. The earth sensor with its optical axis is oriented, as usual, in the direction of the z axis, which is to be continuously pointed toward the center of the earth in an earth-oriented orbit.

The measuring transducers used in the attitude control system include as an essential element a triaxially measuring set of gyroscopes for the direct, measuring tracking of the components of the satellite rotating velocity vector $\underline{\omega}=(\omega_x, \omega_y, \omega_z)^T$, which are related to the system of coordinates that is fixed relative to the satellite. These measured values are needed in the prior-art satellite, because the control is designed in the prior art system correspondingly to perform the desired attitude control maneuvers. However, the use of such gyroscopes has the serious drawback that they are electromechanical components, on which very high requirements are to be imposed especially under the extreme conditions prevailing in space, and which are very trouble-prone and susceptible to wear. The redundant design, which is necessary as a result, represents a considerable cost factor. In addition, the use of sun sensors is limited in near-earth orbits due to the relatively long eclipse times ($\Delta$ time during which the sun is in the earth's shadow).

SUMMARY AND OBJECTS OF THE INVENTION

The basic object of the present invention is therefore to provide a satellite of the type described in the introduction, whose attitude control system has the lowest cost possible but is reliable in operation.

According to the invention, a triaxially stabilized earth oriented satellite is provided with an attitude control system. The attitude control system contains a controller, final control elements for generating control torques around each of three axes of the system of coordinates (principle axes x, y, z) as fixed relative to the satellite. Additionally, the attitude control system includes a direction vector measurement, e.g. from a magnetometer or star sensor, and a sun sensor array. The attitude control system is comprised exclusively of the direction vector measurement means, the sun sensor array and the earth sensor as the measuring transducers.

Thus, a triaxial magnetometer is now used, and, if needed, a sun sensor array, whose field of view should be greater than 60° in both directions at right angles to the optical axis, and which needs to deliver only a uniaxial measured signal, which becomes zero when the sun is located in the desired plane. The sun vector component that is vertical on this plane is controlled according to the process described in the U.S. Pat. No. 5,132,910 (which is hereby incorporated by reference), the velocity information being obtained from the magnetometer in the case of the present invention.

It is required as an essential feature that the magnetometer, the sun sensor array, and the earth sensor be present as measuring transducers for the attitude control system, i.e., no gyroscopes are needed any more. Special control laws, which do not require any direct measured values for the components of the satellite rotating velocity vector $\underline{\omega}$ and which requires only the measuring transducers described for providing the control signals, are used for this purpose in the controller.

Processes for performing the sun and earth acquisition, which satisfy the requirements imposed above and can be used in a satellite according to the present invention, which has no gyroscopes, are described herein.

According to the process of the invention, the apparatus is provided as noted above and a process is performed for sun and earth acquisition in a satellite including the steps of:

A. Determining an estimate for the rotating velocity of the satellite from a direction vector measurement;

B. Searching for the sun, depending on a size of the field of view of the sensor, by one or two search rotations at right angles to the optical axis;

C. Adjusting the direction of the sun relative to the optical axis; and

D. Adjusting the direction vector measurement to a reference direction $S_R$, which is selected such that the optical axis of the earth sensor sweeps over the earth during rotation around $S_R$.

The sun acquisition is a maneuver which is known to be intended to point one of the principal axes of the satellite, e.g., the x axis, toward the sun. The solar generators, which can be extended in the direction of the y axis and are rotatable around this axis, are then unfolded at least partially and turned toward the sun in order to thus ensure the energy supply, e.g., in the transfer orbit, already to a certain minimum extent. The purpose of the earth acquisition maneuver is to point another of the three principal axes of the satellite, e.g., the z axis, toward the center of the earth, because the antennas on the satellite, which are used for communication with the earth station or earth stations, are oriented in this direction. This maneuver is to be performed, in general, already in the transfer orbit, but also in the final geostationary orbit after performing the apogee maneuver.

The various features of novelty which characterize the invention are pointed out with particularity in the claims annexed to and forming a part of this disclosure. For a better understanding of the invention, its operating advantages and specific objects attained by its uses, reference is made to the following description of preferred embodiments of the invention.

DESCRIPTION OF THE PREFERRED EMBODIMENTS

Figure 1:
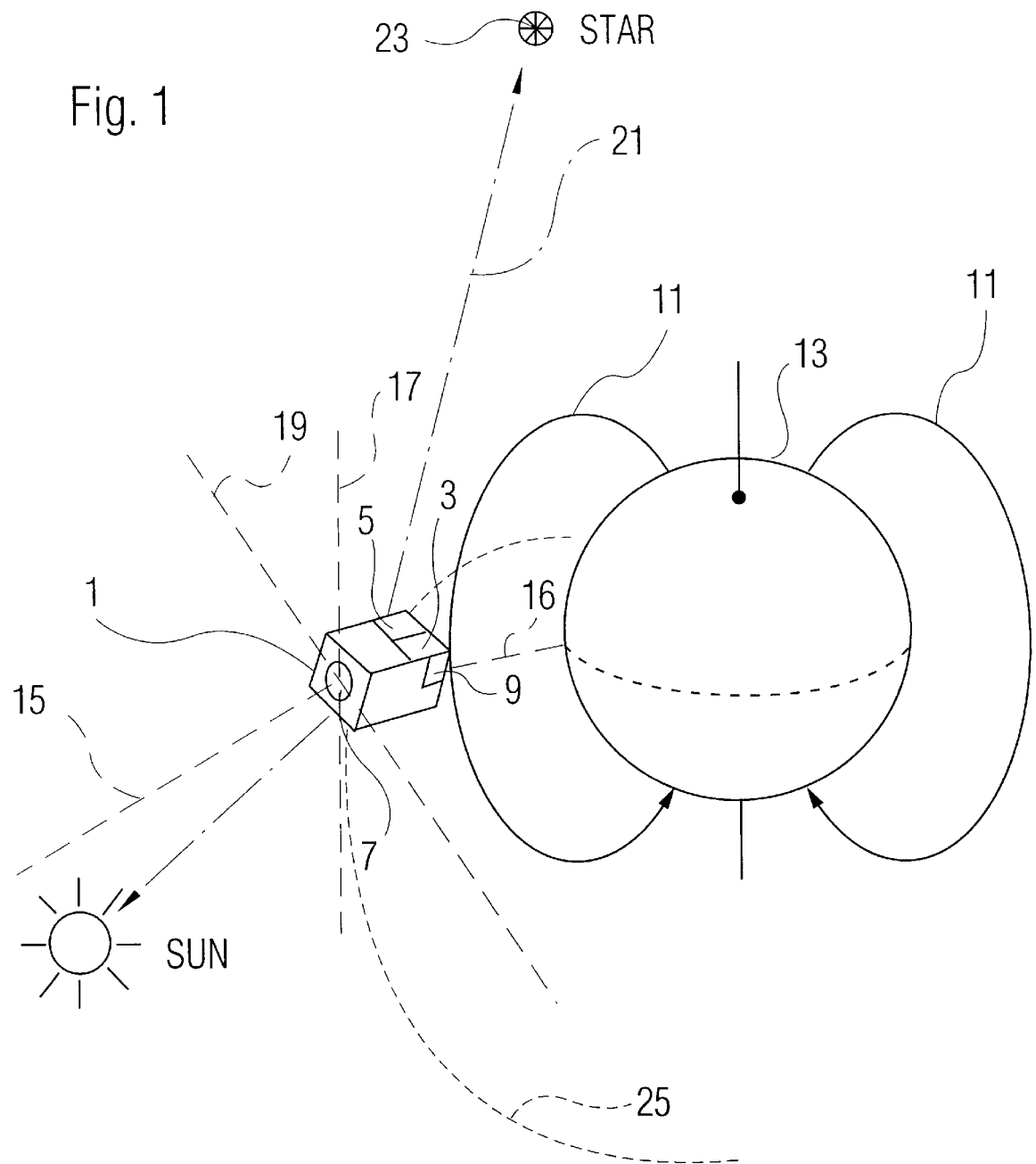
FIG. 1 is a schematic diagram of a satellite in an earth orbit.
Figure 2:
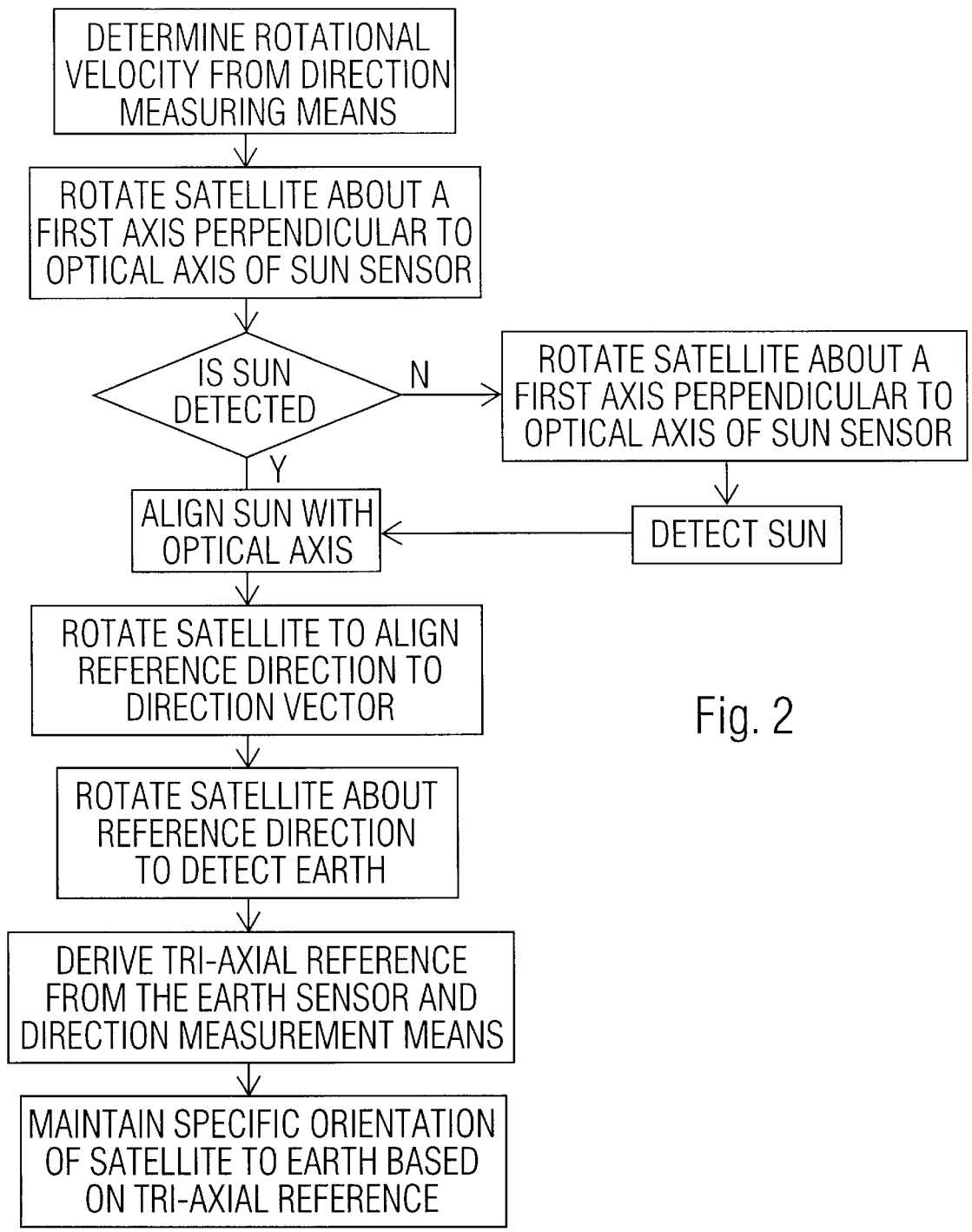
FIG. 2 is a flow diagram showing the procedure for sun and earth acquisition.

Referring to the drawings, and in particular to FIG. 1, a triaxially stabilized earth oriented satellite 1 is provided with an attitude control system for maintaining the desired orientation of the satellite 1 in an orbit 25. The attitude control system comprises as measuring transducer exclusively a direction vector measurement means, like a magnetometer 3 or star sensor 5, a sun sensor array 7 and an earth sensor 9, and also includes a controller, final control elements or torque means, preferably impulse attitude control nozzles, for generating, as a function of the control signals sent by the controller, control torques around each of three axes of the system of coordinates (the principal axes x, y, z) that is fixed relative to the satellite. The magnetometer 3 measures the direction of the magnetic field lines 11 of the earth 13 and the star sensor 5 measures the direction 21 of a star 23. This arrangement therefore uses a selective group of measuring transducers not including the electromechanical devices as known in the art.

The process for sun and earth acquisition employed with such a triaxially stabilized earth oriented satellite with the particulars noted above comprises the determination of an estimate of the rotating velocity of the satellite from a direction vector measurement, a sun search, depending on the size of the field of view of the sensor 7, by one or two search rotations about axes 17, 19 at right angles to the optical axis 15, an adjustment of the direction of the sun to the optical axis and an adjustment of the direction vector measurement to a reference direction $S_R$, which is selected such that the optical axis 16 of the earth sensor 9 sweeps over the earth 13 during rotation around $S_R$.

As essential information for the sun and earth acquisition, an estimate is needed for the rotating velocity vector $\omega$, which is obtained as follows:

The inertial rotating speed $\omega$ of the spacecraft fits the Euler equation:

$$J_s \dot{\omega} + \tilde{\omega}(J_s \omega + h_\omega) = t_c$$

$J_s$: inertia tensor of the satellite, $t_c$: controlling torque vector, $h_\omega$: spin vector, if present.

$$\tilde{\omega} = \begin{bmatrix} 0 & -\omega_z & \omega_y \\ \omega_z & 0 & -\omega_x \\ -\omega_y & \omega_x & 0 \end{bmatrix} \text{ Cross product matrix}$$

Using the expression $$\omega = (I - S_B S_B^T)\omega + S_B S_B^T \omega =: \omega_q + S_B \cdot c \tag{2}$$

$S_B$: unit vector in the direction of the magnetic field 11 in the satellite coordinates $\omega_q$: component of $\omega$ transverse to direction vector c: positive or negative value of component of $\omega$ parallel to direction vector $$\dot{\omega}_q + \dot{S}_B c + \dot{c} S_B = J_s^{-1} t_c - d_0 - d_1 c - d_2 c^2 \tag{3}$$

in which $$d_0 = J_s^{-1} \tilde{\omega}_q (J_s \omega_q + h_\omega) \tag{4 a}$$

$$d_1 = J_s^{-1}[\tilde{\omega}_q J_s S_B + \tilde{S}_B (J_s \omega_q + h_\omega)] \tag{b}$$

$$d_2 = J_s^{-1} \tilde{S}_B J_s S_B \tag{c}$$

follows from (1).

By multiplying Equation (3) by $\tilde{S}_B$ (to eliminate $\dot{c}$) from the left, this equation changes to $$(\tilde{S}_B \dot{S}_B + \tilde{S}_B d_1) c + \tilde{S}_B d_2 c^2 = \tilde{S}_B (J_s^{-1} t_c - d_0 - \dot{\omega}_q) = \tilde{S}_B r \tag{5}$$

From the relationship $$\dot{S}_B = \tilde{S}_B \omega + T^{BI} \dot{S}_I \tag{6 (a)}$$

$$-\tilde{S}_B \dot{S}_B = (I - S_B S_B^T)\omega - \tilde{S}_B T^{BI} \dot{S}_I = \omega_q + \delta, \tag{b}$$

in which $S_I$: is the unit vector in the direction of the magnetic field in the inertial system $T^{B1}$: is the transformation matrix from body (satellite) to inertial coordinate system and $\delta$: is the velocity error that is tolerable for acquisition maneuvers.

After an approximate differentiation of $S_B$, e.g., according to (a) $\dot{x} =$ $$\frac{1}{T_F}$$

$(S_B - x)$ filtering of $S_B$ \hfill (7)

(b) $\dot{S}_B =$ $$\frac{1}{T_F}$$

$(S_B - x)$, an approximation $\hat{\omega}_q$ can immediately be obtained for the first part of the velocity sought according to (2)

$$\hat{\omega}_q = -\tilde{S}_B \dot{S}_B$$

After another approximate differentiation of $\hat{\omega}_q$ analogously to (7), all variables except c are known in (5), and a vectorial, nonlinear (second-power) conditional equation is thus available for this, and, after solving this equation, together with (8), an approximation is obtained for ω according to (2).

Following the so-called Gauss-Levenberg-Marquardt algorithm, an iterative method proved to be numerically most reliable for solving (5); this iterative method is performed as follows:

Definition of the vector function dependent on $\hat{c}$ ($\Delta$ approximation for c)

$$f(\hat{c}) := (-\hat{\omega}_q + \tilde{S}_B d_1)\hat{c} + \tilde{S}_B d_2 \hat{c}^2 - \tilde{S}_B r \quad \text{(r is defined in equation (5))} \quad (9)$$

with the corresponding derivation $$d) \ (\hat{c}) = \partial f / \partial \hat{c} = -\hat{\omega}_q + \tilde{S}_B d_1 + 2\tilde{S}_B d_2 \hat{c} \quad (10)$$

starting from an initial value $c_0$ (in general, equaling zero), an improved estimate is calculated according to (a) $c_{K+1} = c_K - \Delta c_K$ \quad (11)

(b) $\Delta c_K =$ $$\frac{d^T(c_K) f(c_K)}{\lambda_K + d^T(c_K) d(c_K)}$$

in which the parameter $\lambda_K$ is adapted on the basis of an initial value (typically: $\lambda_0 = 10^{-2}$) according to (a) $\lambda_{K+1} = \lambda_K$, if $(1+\epsilon)f_m > |f_K| > (1-\epsilon)f_m$, $f_m$ unchanged \quad (12)

(b) ti $\lambda_{K+1} = \lambda_K / I_f$ if $|f_K| \leq (1-\epsilon)f_m$, $f_m = |f_K|$ (c) $\lambda_{K+1} = \lambda_K \cdot I_f$, if $|f_K| \leq (1-\epsilon)f_m$, $f_m = |f_K|$ in which (a) $f_{m0} = 0$ \quad (13)

(b) $\epsilon = 0.02 \div 0.05$ (c) $|f_K| = \sqrt{f^T(c_K) f(c_K)}$ (d) $I_f = 2 \div 5$ After calculating $\hat{\omega}_q$ and $\hat{c} \cong c_{K+1}$, the sun is brought into the field of view of the sun sensor in the known manner by
- one search rotation at right angles 17 to the optical axis 15 of the sun sensor 7, if the field of view of the sensor is ±90° ($\Delta$ covering the half-space in which the optical axis is located) or
- two search rotations at right angles 17, 19 to each other and to the optical axis if the field of view does not cover the entire half-space.

The control law used to bring the sun into the field of view of the sun sensor 7 is as follows:

$$u_D = -K_{D1}(\hat{\omega}_q - \omega_{bq}) - K_{D2}(\hat{c} - c_b)S_B \quad (14)$$

in which $$\omega_{bq} = (I - S_B S_B^T)\omega_b$$

$$c_b = S_B S_B^T \omega_b$$

$\omega_b$: desired velocity value $K_{D1}$: diagonal matrix of the gain factors for the transverse velocity $K_{D2}$: gain factors for velocity around $S_B$.

To adjust the direction of the sun into the optical axis 15, it is possible to use, e.g., the control law described in the U.S. Pat. No. 5,132,910, which leads, on the whole, to $$u = u_D + K_p[\tilde{o} - I]e_M L\{N_{sy}\} \quad (15)$$

in which
u: commanded external control torque
o: unit vector of the optical axis 15 of the sun sensor 7
$e_M$: unit vector of the direction of measurement of the sun sensor 7
I: identity matrix
$K_p$: diagonal matrix of the attitude gain factors
$N_{sy}$: sun sensor measured signal
L: limiter
$\omega_b \cong d \cdot o$ in component $u_D$
d: rate of rotation around the optical axis.

The earth acquisition is achieved by adjusting the direction of the magnetic field to a predetermined reference direction $S_R$, which is selected such that the optical axis 15 of the earth sensor 9 sweeps over the earth 13 during a rotation around $S_R$. The corresponding control law is $$u = u_D + K_p L\{\tilde{S}_R S_B\} \quad (16)$$

$\omega_b \Delta d \cdot S_R$ in component $u_D$.

After the earth appears in the field of view of the earth sensor, a triaxial reference can be derived from the earth sensor and magnetometer signals and be used in the known manner to maintain the orientation toward the earth.

It shall finally be pointed out that all the explanations given above remain correct if another direction vector measurement, e.g., from a star sensor, is used instead of the magnetometer.

While specific embodiments of the invention have been shown and described in detail to illustrate the application of the principles of the invention, it will be understood that the invention may be embodied otherwise without departing from such principles.

We claim:
1. Process for performing the sun and earth acquisition by a triaxially stabilized, earth-oriented satellite with an attitude control system, the attitude control system comprising a controller, final control element means for generating control torque around each of the three axes of the system of coordinates (principal axes x, y, z) that is fixed relative to the satellite, and measuring transducers formed exclusively of a sun sensor array and an earth sensor, and direction vector measurement means, the process comprising the steps of:
   determining an estimate for the rotating velocity of the satellite from the direction vector measurement;
   making a sun search, depending on the size of the field of view of the sensor, by one or two search rotations at right angles to the optical axis;
   adjusting the direction of the sun into the optical axis; and
   adjusting the direction vector measurement to a reference direction $S_R$ which is selected such that the optical axis of the earth sensor sweeps over the earth during rotation around $S_R$.

2. A process according to claim 1, wherein said estimate of the rotational velocity is determined based on the equations as follows:

$$J_s\dot{\omega}+\omega(J_s\omega+h_\omega)=t_c$$

$J_s$: inertia tensor of the satellite,
$t_c$: controlling torque vector,
$h_\omega$: spin vector, if present, $$\tilde{\omega}=\begin{bmatrix} 0 & -\omega_z & \omega_y \\ \omega_z & 0 & -\omega_x \\ -\omega_y & \omega_x & 0 \end{bmatrix} \text{Cross product matrix}$$

and $$\omega=(I-S_B S_B^T)\omega+S_B S_B^T\omega=:\omega_q+S_B c$$

$S_B$: unit vector in the direction of the magnetic field in the satellite coordinates
$\omega_q$: component of $\omega$ transverse to direction vector
c: positive or negative value of component of $\omega$ parallel to direction vector.

3. A process according to claim 2, wherein an estimate of $\omega_q$ is performed as follows:

$$\omega_q = \tilde{S}_B \tilde{S}_B.$$

4. A process according to claim 2, wherein an estimate of c is performed based on the equation as follows:

$$(\tilde{S}_B \tilde{S}_B + \tilde{S}_B d_1)c + \tilde{S}_B d_2 c^2 = \tilde{S}_B(J_s^{-1}t_c - d_o - \dot{\omega}_q).$$

5. A process according to claim 1, wherein said sun search is made based on a control law to bring the sun into the field of view of the sun sensor as follows:

$$u_D = -K_{D1}(\hat{\omega}_q - \omega_{bq}) - K_{D2}(\hat{c} - c_b)S_B$$

$$\omega_{bq} = (I - S_B S_B^T)\omega_b$$

$$c_b = S_B S_B^T \omega_b$$

$\omega_b$: desired velocity value
$K_{D1}$: diagonal matrix of the gain factors for the transverse velocity
$K_{D2}$: gain factors for velocity around $S_B$.

6. A process according to claim 1, wherein said adjustment of the direction of the sun to the optical axis is made using the control law as follows:

$$u = u_D + K_p[\tilde{o} - I]e_M L\{N_{sy}\}$$

u: commanded external control torque
o: unit vector of the optical axis of the sun sensor
$e_M$: unit vector of the direction of measurement of the sun sensor
I: identity matrix
$K_p$: diagonal matrix of the attitude gain factors
$N_{sy}$: sun sensor measured signal
L: limiter
$\omega_b \equiv d \cdot o$ in component $u_D$
d: rate of rotation around the optical axis.

7. A process according to claim 1, wherein said adjustment of the direction vector measurement to the reference direction $S_R$ is made using the control law as follows:

$$u = u_D + K_p L\{\tilde{S}_R S_B\}.$$

8. A process in accordance with claim 1, wherein: said direction measurement means includes one of a magnetometer and star sensor.

9. A process for performing sun and earth acquisition by an earth-oriented satellite, the process comprising the steps of:

providing measuring transducers on the satellite formed exclusively of a sun sensor array having an optical axis, an earth sensor;

providing direction vector measurement means for measuring a direction vector on the satellite;

determining an estimate for a rotating velocity of the satellite from said direction vector measurement means;

performing a first rotating of the satellite about an axis perpendicular to said optical axis of said sun sensor;

detecting a position of the sun during said first rotating;

aligning said position of the sun with said optical axis of said sun sensor;

performing a second rotating of the satellite to align a predetermined reference direction of the satellite with said direction vector, said predetermined reference direction and said earth sensor having an orientation to cause said earth sensor to sweep over the earth when the satellite is rotated about said reference direction.

10. A process in accordance with claim 9, wherein:
said direction vector measurement means includes one of a magnetometer and star sensor.

11. A process in accordance with claim 9, wherein:
a final control element means is provided on the satellite for generating control torques around each of three axes of a coordinate system fixed relative to the satellite to perform said rotating.

12. A process in accordance with claim 9, wherein:
said direction vector is inertial.

13. A process in accordance with claim 9, wherein:
said direction vector aligns with one of a magnetic field line of the earth and a direction of a star.

14. A process in accordance with claim 9, further comprising:
rotating the satellite about said reference direction to bring the earth into a field of view of said earth sensor;

deriving a tri-axial reference from said earth sensor and said direction vector measurement to maintain a specific orientation toward the earth.

15. A process in accordance with claim 9, wherein:
said sun sensor has a field of view of less than 180 degrees, and said first rotating including two search rotations about axes at right angles to each other and to said optical axis.

16. An earth-oriented satellite comprising:
torque means for generating control torques around each of three axes of a coordinate system fixed relative to the satellite;

a sun sensor array having an optical axis;

an earth sensor;

a direction vector measurement means for measuring a direction vector;

control means connected to said torque means, said sun sensor array, said earth sensor and said direction vector measurement means, said control means determining an estimate for a rotating velocity of the satellite from said direction vector measurement means, said control means rotating the satellite about an axis perpendicular to said optical axis of said sun sensor, said control means detecting a position of the sun during said rotating, said control means aligning said position of the sun with said optical axis of said sun sensor, and said control means rotating the satellite to align a predetermined reference direction of the satellite with said direction vector, said predetermined reference direction and said earth sensor having an orientation to cause said earth sensor to sweep over the earth when the satellite is rotated about said reference direction.

* * * * *